United States Patent [19]
Isaack

[11] Patent Number: 5,621,622
[45] Date of Patent: Apr. 15, 1997

[54] POWER CONVERTER OVERLOAD PROTECTION CIRCUIT

[75] Inventor: Edwin R. Isaack, Austin, Tex.

[73] Assignee: Operating Technical Electronics, Inc., Grand Prairie, Tex.

[21] Appl. No.: 420,673

[22] Filed: Apr. 12, 1995

[51] Int. Cl.$^6$ .................................................. B23K 9/10
[52] U.S. Cl. .................................................. 363/18
[58] Field of Search .................................. 363/18, 16, 17, 363/22, 23, 21, 89, 97, 124, 140–143

[56] References Cited

U.S. PATENT DOCUMENTS 5,446,641   8/1995   Reynolds et al. .......................... 363/17

*Primary Examiner*—Aditya Krishnan
*Attorney, Agent, or Firm*—Jack A. Kanz

[57] ABSTRACT

Overload protection for an AC/DC converter is formed by a high frequency AC power signal provided to a step-down/isolator circuit which converts the power signal to a low voltage signal. An output filter stage then converts the low voltage AC signal to a DC output for use in DC devices. Upon the occurrence of a short circuit or a current overload, the step-down/isolator circuit core becomes saturated, ceasing operation of the step-down/isolator until the short or the connected device drawing the current overload is removed.

19 Claims, 3 Drawing Sheets

POWER CONVERTER OVERLOAD PROTECTION CIRCUIT

This invention relates to overload protection for AC/DC converters. More particularly, it relates to circuits for providing short circuit current and overload protection on the output of an AC/DC converter.

BACKGROUND OF THE INVENTION

Many remote accessory devices are designed to be powered by mobile direct current (DC) sources such as storage batteries and related systems used in automobiles, pleasure boats, etc. Due to the idiosyncrasies of portable power supplies, devices such as cellular phones or notebook computers require cable connections and power converters specifically designed to interface with mobile power supplies such as a cigarette lighter power source commonly found in cars and other vehicles.

Generally, portability is greatly desired and expected in many devices used either in a vehicle or at home. For example, a cellular phone may preferably be used at home or in the car because it typically incurs service charges similar to that of telephones hardwired in a house. Furthermore, to limit the necessity of keeping track of multiple phone numbers or the associated expenses, users typically prefer to utilize a single mobile phone unit wherever a suitable power source is located. Such use limits phone expenses by limiting the number of individual phone units to typically one cellular unit. Therefore, household voltage power converters and adapters have been created for allowing a greater variety of locations in which low voltage devices such as cellular phones can be used.

When exposed to the overloads typical in household AC power supplies, either the converter or the portable device may suffer damage requiring repair expense and inconvenience. A need exists for conversion circuitry that latches into an inoperative state while the overload condition persists.

SUMMARY OF THE INVENTION

In accordance with the present invention an overload circuit is implemented in an alternating current-to-direct current (AC/DC) converter circuit. The AC/DC converter comprises a rectifier with terminals which accept an AC power source. The rectifier output terminals are connected to a step-down/isolator circuit having a core and at least four windings. A chopping configuration provides a high frequency power signal to the step-down/isolator configuration for efficient conversion from a high voltage signal to a low voltage signal. The chopping configuration is electrically connected to a second terminal of the first winding of the step-down/isolator configuration for providing a high frequency AC signal to the transformer for converting the high frequency signal to a low voltage AC signal through the fourth winding of the step-down/isolator configuration. An output configuration is electrically connected across the terminals of the fourth winding of the step-down/isolator configuration to convert the low voltage AC signal to a DC voltage output.

Certain predetermined conditions, such as a short across the output configuration of the AC/DC converter or a current overload being drawn by a device connected to the converter, automatically switch the converter circuit into an overload protection mode. That is, the AC/DC converter responds to the predetermined condition by saturating the core of the step-down/isolator configuration. The core saturation is maintained as long as the predetermined condition persists. Operation of the AC/DC converter is restored by interrupting the predetermined condition.

DESCRIPTION OF THE DRAWING

Various advantages and features of the invention will become more readily understand from the following detailed description taken in connection with the appended claims and attached drawing in which:

The accompanying drawing is incorporated into and forms a part of the specification only for the purpose of illustrating preferred and alternative examples of how the invention can be made and used. It is not to be construed as limiting the invention to only the illustrated and described examples.

DESCRIPTION OF PREFERRED EMBODIMENT

Figure 1:
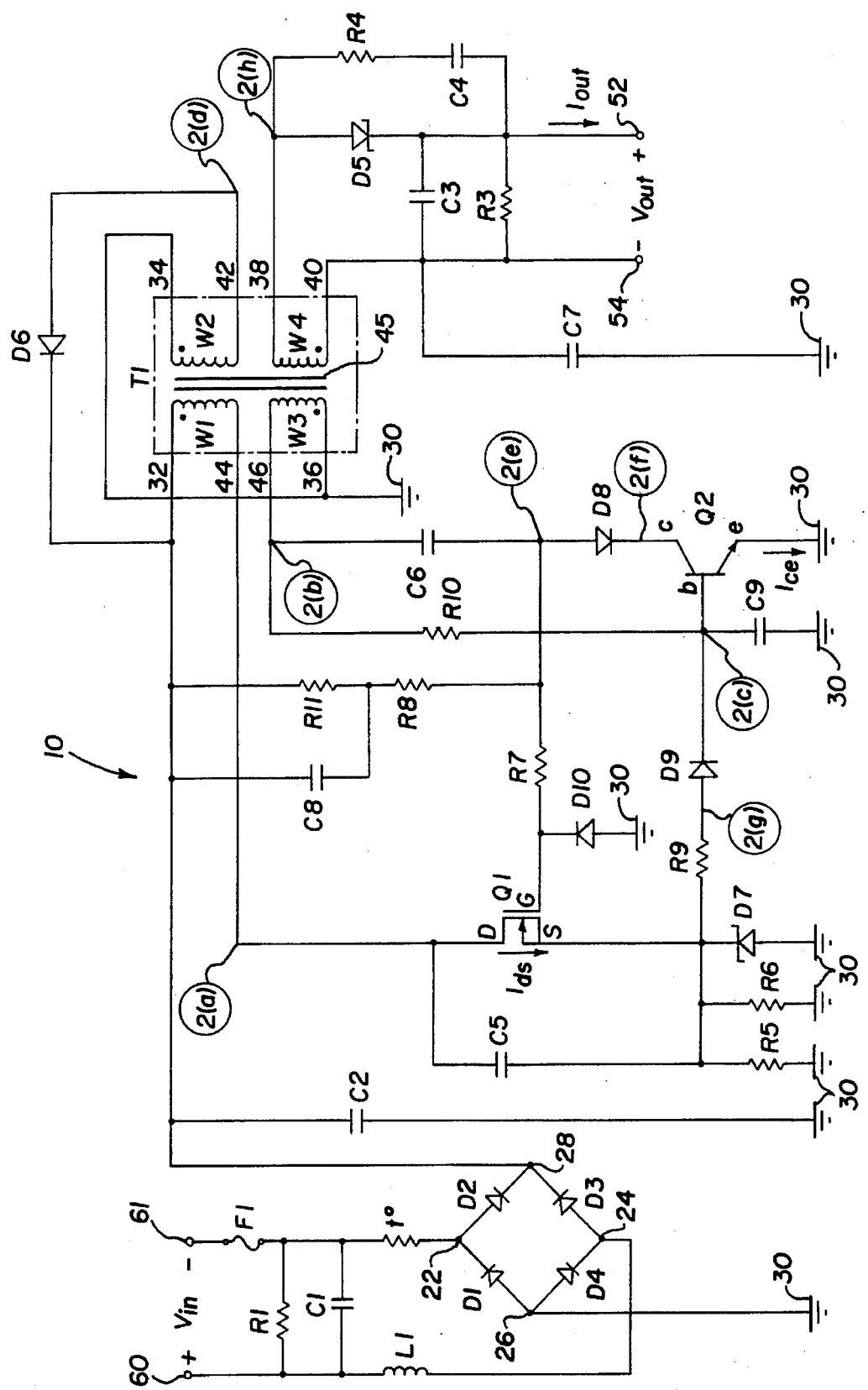
FIG. 1 is a schematic view of an AC/DC converter employing a latching configuration in accordance with the invention.

An alternating current-to-direct current (AC/DC) converter generally designated by the numeral 10 is illustrated in FIG. 1. The converter 10 comprises a rectifier configuration; a voltage step-down/isolator configuration; a chopping configuration; and an output configuration. The rectifier configuration comprises a low-pass line filter circuit connected to a rectifier bridge comprising diodes D1, D2, D3 and D4 to rectify a typical 120 VAC 60 Hz household power source and produce approximately a 170 VDC rectified signal across capacitor C2. The low-pass filter circuit comprises a resistor R1 in parallel with a capacitor C1. A first terminal of resistor R1 and of capacitor C1 is connected through thermistor t° to a first input terminal 22 of the bridge rectifier between the cathode terminal of diode D1 and the anode terminal of diode D2. A second terminal of the resistor R1 and of the capacitor C1 are connected through an inductor L1 to a second input terminal 24 of the rectifier bridge between the anode terminal of diode D3 and the cathode terminal of the diode D4. The inductor L1, capacitor C1 and resistor R1 are dimensioned to form a low-pass filter sufficient to allow passage of the sinusoidal input voltage source $+V_{in}$ to the rectifier bridge. The components R1, C1 and L1 also act to reduce the switching noise produced by the MOSFET Q1 from exiting the converter 10 into the 120 VAC input voltage source $+V_{in}$ and from interfering with other electronic equipment connected to the same power line.

The primary protection for an input circuit side failure across terminals 60 and 61 is fuse F1. Fuse F1 opens upon an excessive current demand exceeding five (5) amperes for more than a few seconds.

A first output terminal 26 of the rectifier bridge, between an anode terminal of diodes D1 and D4, is connected to a common point or node 30 commonly referred to as a ground plane. A second output terminal 28 of the rectifier bridge, between the cathode terminals of diodes D2 and D3, is connected to terminal 32 of the voltage step-down/isolator configuration.

The step-down/isolator configuration is illustrated as a dual-stage transformer T1. Transformer T1 is available from Taiwan Volt Electronic Co., Ltd. under the part number TF40089. Note that the transformer T1 may have differing physical packages without affecting performance characteristics. For example, the transformer can have a parallel or a perpendicular bobbin, accordingly, for mounting the transformer parallel or perpendicular to a circuit assembly board. A fixed capacitor C2 is shunted across the output terminals of the rectifier bridge. The thermistor t° acts as a peak surge current limiter to protect capacitor C2 during peak charge cycles and further acts as a secondary protection to limit the input short circuit current across terminals 60 an 61 in the event of circuit failure.

The transformer T1 comprises a core 45 and a winding W1 having terminals 32 and 44; a winding W2 having terminals 34 and 42; a winding W3 having terminals 36 and 46; and a winding W4 having terminals 38 and 40. Terminal 34 of winding W2 is connected to terminal 36 of winding W3, providing isolation of the rectified voltage output. The transformer terminals 34 and 36 are also connected to the ground plane 30. A converted signal is placed across the winding W4 at terminals 38 and 40.

The chopping configuration generally comprises a metal-oxide semiconductor field-effect-transistor (MOSFET) Q1 and an npn-bipolar transistor Q2. Terminal 44 of winding W1 is connected to the drain terminal of the MOSFET Q1. A source terminal of the MOSFET Q1 is connected to the ground plane 30 through a parallel configuration of a pair of resistors R5 and R6 and a Zener diode D7. The diode D10 protects the gate-to-source voltage of the MOSFET Q1 against reverse overvoltage which would damage the MOSFET Q1 by shunting negative peak signals to the ground plane. A capacitor C5 is shunted between the drain and the source terminals of the MOSFET Q1. The base terminal of bipolar transistor Q2 is protected by Zener Diode D7. The anode terminal of diode D8 is connected to a terminal of the fixed capacitor C6 such that the anode terminal is connected to the ground plane 30 when bipolar transistor Q2 switches to an active or on state. The gate terminal of the MOSFET Q1 is connected through resistor R7 to the anode terminal of diode D8. A series circuit including resistor R8 and capacitor C8 in parallel with resistor R11 connects the anode terminal of diode D8 to the terminal 32 of winding W1. The anode terminal of diode D8 is also connected through capacitor C6 to terminal 146 of winding W3.

The cathode terminal of diode D8 is connected to the collector terminal of the bipolar transistor Q2. The base terminal of the bipolar transistor Q2 is connected to a cathode terminal of diode D9 and the anode terminal of diode D9 is connected through resistor R9 to the source terminal of the MOSFET Q1. The base terminal of bipolar transistor Q2 is also connected through resistor R10 to the terminal 46 of the transformer T1. The emitter terminal of the bipolar transistor is connected to the ground plane 30.

The output configuration is connected across the terminals 38 and 40 of winding W4. The terminal 38 is connected to an anode terminal of a fast Shottky power rectifier D5. The cathode terminal of the Shottky rectifier D5 is connected to an output ripple filter circuit including a capacitor C3 and a shunted resistor R3. The output voltage $+V_{out}$ is provided across converter terminals 52 and 54. A series circuit including resistor R4 and capacitor C4 connects the terminal 38 of the transformer T1 to the converter output terminal 52. An effect provided by the transformer T1 is to isolate the resistance load of the conversion circuitry from the resistance load of the connected low voltage appliance.

The waveforms generated by the circuit are shown in FIGS. 2(a)–(h). To operate the converter 10, a power source $+V_{in}$ is applied across the input terminals 60 and 61 of the converter 10. The source $+V_{in}$ is typically a 120 VAC source with an input current of about 1 amperes. After passing through the rectifier bridge comprised of diodes D1, D2, D3 and D4, respectively, the $+V_{in}$ source is rectified to a 170 VDC rectified waveform and conveyed to the first winding W1.

Figure 2A:
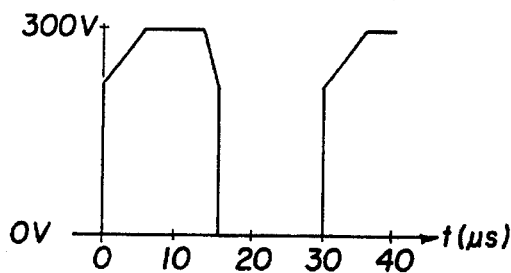
FIGS. 2(a)–(h) are illustrations of signal waveforms as they occur at certain points within the AC/DC converter under operating conditions.

The MOSFET Q1 and the bipolar transistor Q2 produce a high frequency AC voltage of approximately 30 KHz with an amplitude of 300 volts as shown in FIG. 2(a) which is input to terminal 44 of the winding W1. It is desirous to have a high frequency power signal as this increases the efficiency of the voltage and current conversion through transformer T1. A lower frequency typically requires a larger and bulkier transformer to achieve equivalent results. The approximately 300 VAC, 30 KHz frequency signal is converted to an isolated low voltage secondary AC signal across terminals 38 and 40 via the winding ratios between W1 and W4 as shown in FIG. 2(h).

The output configuration rectifies the low voltage AC signal across the terminals 38 and 40 of winding W4 through the Shottky diode D5. The low voltage secondary AC is filtered by capacitor C3 and resistor R3 to produce a low ripple output DC voltage. That is, while the Shottky diode D5 is in a forward bias state, the capacitor C3 stores energy sufficient to provide voltage to the output terminals 52 and 54 when the Shottky diode D5 is in a reverse bias or off state.

The winding W2 of the transformer T1 supplies a free-wheeling diode returning the unused stored energy of transformer T1 to the primary DC source side. From the transformer T1, the anode terminal of diode D6 is connected to a transformer terminal 42 of winding W2. The cathode terminal of diode D6 is connected to transformer terminal 32 of winding W1. Diode D6 improves the efficiency of the transformer and also reduces the voltage stress on the MOSFET Q1 by returning residual energy in the transformer core to the DC or rectified portion of the converter circuit. Windings W1 and W2 are bifilar wound. Winding W2 acts as a reset winding for returning energy stored in the magnetizing inductance to the DC side and thereby reset the core 45 after each frequency cycle.

Figure 2B:
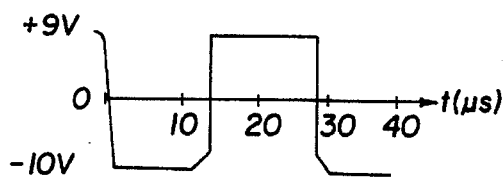
Figure 2C:
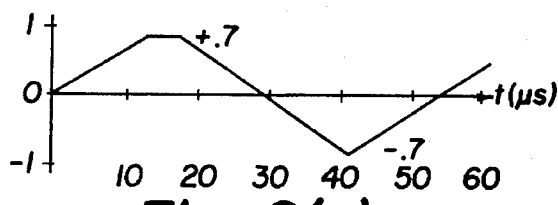
Figure 2D:
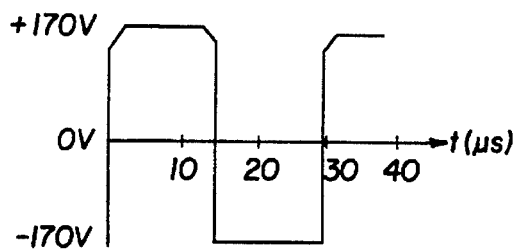
Figure 2E:
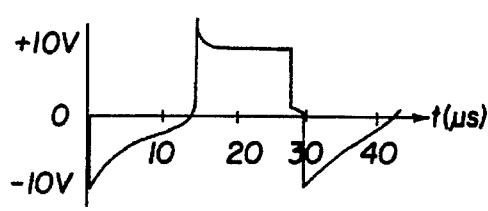
Figure 2F:
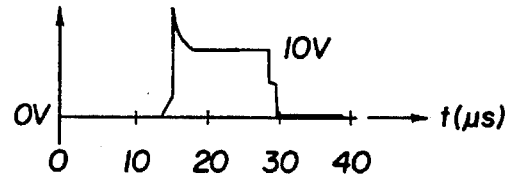
Figure 2G:
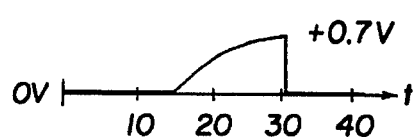
Figure 2H:
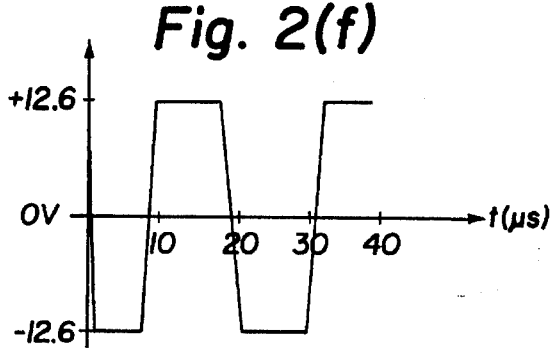

As shown in FIG. 2(b), the winding W3 produces an approximately 10 VAC square wave working with Q1, R5, R7, R6, R9, D9 and transistor Q2. The square wave provides an activate/deactivate signal for Q1. When Q1 is activated, Q2 is deactivated. When Q1 is deactivated, Q2 is activated. This pulsing or triggering of Q1 generates an oscillation of approximately 30 KHz for a high frequency conversion by T1 between the windings W1 and W4.

Capacitor C7 is connected between the terminal 40 of the transformer T1 and the ground plane 30. Capacitor C7 is a filter that shunts the high frequency switching noise and output ripple to the ground plane to prevent the noise from being output to the DC output terminals 52 and 54.

The power converter circuit 10 disclosed is an unregulated switcher of the forward converter type which provides a low cost output short circuit protection by using the magnetic properties of the transformer T1. The circuit uses the hysteresis and saturative characteristics of the transformer's magnetic core 45 to act as a "mag amp" to latch the output to a safe operating low voltage point. That is, if an output load draws a current exceeding about 8 amperes, or if the output terminals are short circuited, the core of the transformer T1 is driven into a saturation or foldback state. While the core 45 is saturated, no voltage conversions can take place, and the timing signal (shown in FIG. 2(b)) to the bipolar transistor Q2 is terminated. Conventionally, such current overloads are handled by opening a fuse, but this would then require repair of the converter circuit by replacement of the fuse(s) contained in the circuit packaging.

Figure 3:
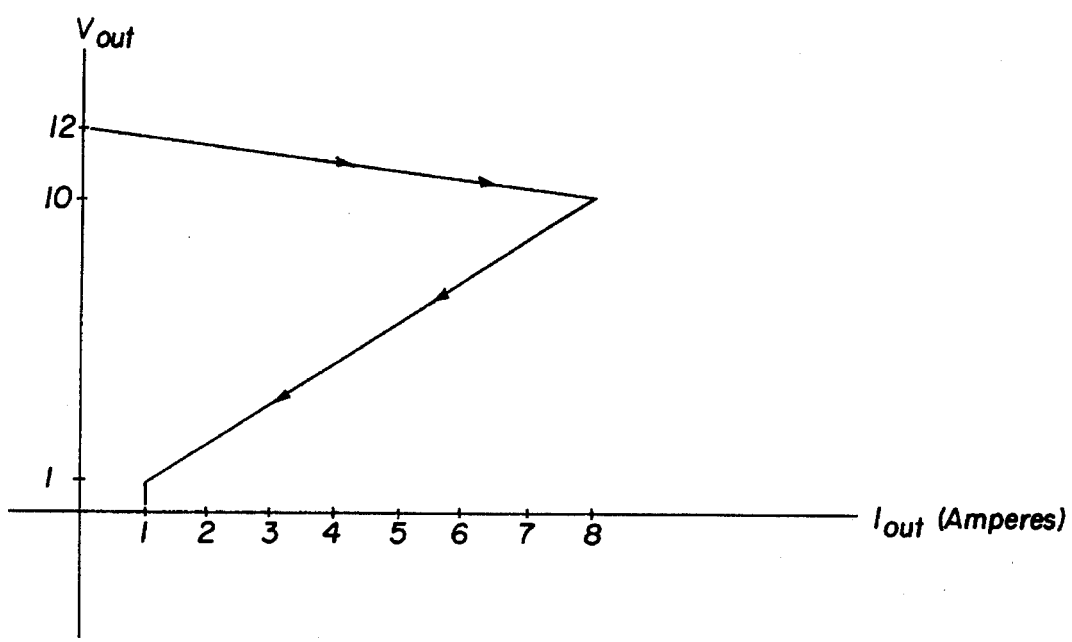
FIG. 3 is an illustration of the effect of a shorted output or an output current $I_{out}$ which exceeds a predetermined current level.

The effect of the transformer core 45 hysteresis on the output voltage-to-current relation is shown in FIG. 3. The converter circuit latches into the safe lower operating area or "foldback" state until and unless the output current is dropped to well below its current limit or the short circuit is removed. That is, as the output current $I_{out}$ increases due to the load demand by the connected electronic device, the transformer core 45 begins to saturate. As the current continues increasing, the voltage and the current are diverted to a foldback state by the hysteresis provided by the core of the transformer, limiting the output through winding W4. At this point, the timing square wave shown in FIG. 2(b) which operates transistor Q2 is not produced at the winding W3, preventing the triggering of the MOSFET Q1. Because MOSFET Q1 is not triggered, the high frequency power waveform output as shown in FIG. 2(a) is not produced. Because any voltage coming into the winding W1 is not at a high frequency, the transformer T1, as provided, cannot convert the input and place it on the winding W4 due to the saturation of the transformer core 45. Thus, the overload condition is quelched, preventing damage to the converter circuit 10 or the connected electronic devices. The configuration as shown has a design limit of about 5.25 amperes.

When the output current $I_{out}$ returns to its design limit or the short is removed, the core 45 of the step-down/isolator configuration converter circuit 10 resets and continues operations without damage to the converter circuit 10 typically associated with a current overload or a short circuit across terminals 52 and 54. That is, once the output current is reduced or the short is removed, the transformer core is allowed to unsaturate, effectively resetting the hysteresis characteristics of the transformer core to an operational point on the hysteresis curve. This permits the winding W3 to again resume producing the chopping timing signal to transistor Q2 to provide the 300 VAC output of the signal through MOSFET Q3.

Although the invention has been described with particular reference to a particular overload protection circuit, the form of the invention shown and described is to be taken as illustrative of the principles thereof. Accordingly, it is to be understood that various changes, modifications and rearrangements may be resorted to without departing from the spirit and scope of the invention as defined by the appended claims.

What is claimed:

1. An overload protection circuit implemented in an alternating current-to-direct current converter circuit for converting an AC power signal to a DC low voltage signal comprising:
   (a) a rectifier bridge configuration with an input terminal for accepting and rectifying the AC power signal;
   (b) a step-down/isolator configuration having a core and at least four windings, said step-down/isolator configuration having a first terminal of the first winding electrically connected to an output terminal of said rectifier bridge;
   (c) a chopping circuit electrically connected to a second terminal of the first winding of said step-down/isolator configuration for providing a high frequency AC signal to the step-down/isolator configuration for converting the high frequency signal to a low voltage AC signal through the fourth winding, said chopping circuit comprising:
      (i) a first transistor with a first terminal electrically connected to the second terminal of the first winding of the step-down/isolator configuration and a second terminal of said first transistor electrically connected to a ground plane; and
      (ii) a second transistor with a first terminal electrically connected to the first terminal of the third winding of said step-down/isolator configuration and a second terminal of said second transistor electrically connected to the ground plane; and
   (d) an output configuration electrically connected across the terminals of the fourth winding of said step-down/isolator configuration to convert the low voltage AC signal to a filtered DC voltage output across a pair of output terminals, wherein the core of said step-down/isolator configuration, in response to a predetermined condition, is driven into a foldback state until the predetermined condition lapses.

2. An overload protection circuit as defined in claim 1 wherein the predetermined condition is a short across the pair of output terminals of said output configuration.

3. An overload protection circuit as defined in claim 1 wherein the predetermined condition is an output current exceeding about 8 amperes.

4. An overload protection circuit as defined in claim 1 wherein said output configuration is a ripple filter.

5. An overload protection circuit as defined in claim 1 wherein said first transistor Q1 is a MOSFET.

6. An overload protection circuit as defined in claim 1 wherein said second transistor Q2 is an npn-bipolar transistor.

7. The combination comprising:
   (a) a rectifier bridge having a first and a second input terminal;
   (b) a transformer having a core and at least four windings, each of said windings having a first and second terminal with the first terminal of the first winding electrically connected to an output terminal of said rectifier bridge and the second terminal of the second winding electrically connected to the first terminal of the first winding;
   (c) a ripple filter circuit electrically connected across the first and the second terminals of the fourth winding of said transformer for providing a filtered DC output; and
   (d) a chopping circuit electrically connected to a second terminal of the first winding of said transformer for providing a high frequency AC signal to the transformer for converting the high frequency signal to a low AC voltage through the fourth winding of said transformer, said chopping circuit comprising:
      (i) a FET-based transistor with a first terminal electrically connected to the second terminal of the first winding of the transformer and a second terminal of said FET-based transistor electrically connected to a ground plane; and
      (ii) a bipolar transistor with a first terminal electrically connected to the first terminal of the third winding of said transformer and a second terminal of said bipolar transistor is electrically connected to the ground plane,
   wherein in response to a predetermined condition the core of said transformer is driven into a foldback state until the predetermined condition lapses.

8. The combination defined in claim 7 wherein said FET-based transistor is a MOSFET.

9. The combination defined in claim 7 wherein said bipolar transistor is an npn-bipolar transistor.

10. A method of deactivating an AC/DC converter implementing a step-down/isolator circuit having a core comprising the steps of:

(a) saturating a core in the step-down/isolator circuit to limit the output current in response to a predetermined condition on the output terminals of the step-down isolator circuit;

(b) maintaining the saturation of the core in the step-down/isolator circuit to limit the output current to a level sufficient to prevent damage to the AC/DC converter; and (c) restoring operation of the AC/DC converter by interrupting the predetermined condition on the output terminals of the step-down isolator circuit.

11. A method of deactivating an AC/DC converter as set forth in claim 10 wherein the step-down/isolator circuit is a transformer having at least four windings.

12. A method of deactivating an AC/DC converter as set forth in claim 10 wherein the predetermined condition is a short across the output terminals of the step-down/isolator circuit.

13. A method of deactivating an AC/DC converter as set forth in claim 10 wherein the predetermined condition is a current overload.

14. A method of deactivating an AC/DC converter as set forth in claim 13 wherein the current overload exceeds about 8 amperes.

15. A method of protecting an AC/DC converter from predetermined output overload conditions comprising the steps of:

(a) rectifying an input AC voltage with a diode bridge to produce a first DC voltage;

(b) chopping said first DC voltage with first and second transistors to produce a high frequency AC voltage;

(c) stepping down said high frequency AC voltage with a transformer to produce a low voltage AC signal;

(d) rectifying said low voltage AC signal to produce a second DC voltage;

(e) filtering said second DC voltage to produce a low ripple output DC voltage;

(f) limiting the output current corresponding to said output DC voltage to protect the AC/DC converter from predetermined output overload conditions, wherein in response to such predetermined overload conditions said transformer is driven into a foldback state;

(g) maintaining said foldback state in said transformer as long as said predetermined overload condition persists; and (h) restoring normal operation of said transformer and said AC/DC converter once said predetermined overload condition lapses.

16. A method as set forth in claim 15 wherein said predetermined overload condition is a short across the output of said AC/DC converter.

17. A method as set forth in claim 15 wherein said predetermined overload condition is an output current exceeding about eight amperes.

18. A method as set forth in claim 15 wherein said first transistor is a MOSFET.

19. A method as set forth in claim 15 wherein said second transistor is an npn-bipolar transistor.

* * * * *

UNITED STATES PATENT AND TRADEMARK OFFICE
CERTIFICATE OF CORRECTION

PATENT NO. : 5,621,622
DATED : April 15, 1997
INVENTOR(S) : Edwin R. Isaack

It is certified that error appears in the above-indentified patent and that said Letters Patent is hereby corrected as shown below:

Col. 3, line 15, "an" should read ---and---

Col. 3, line 48, "146" should read ---46---

Signed and Sealed this

Eighth Day of July, 1997

*Attest:*

*Attesting Officer*

BRUCE LEHMAN

*Commissioner of Patents and Trademarks*